(12) United States Patent
Watson

(10) Patent No.: US 7,752,043 B2
(45) Date of Patent: Jul. 6, 2010

(54) MULTI-PASS SPEECH ANALYTICS

(75) Inventor: Joseph Watson, Alpharetta, GA (US)

(73) Assignee: Verint Americas Inc., Melville, NY (US)

( * ) Notice: Subject to any disclaimer, the term of this patent is extended or adjusted under 35 U.S.C. 154(b) by 950 days.

(21) Appl. No.: 11/540,322

(22) Filed: Sep. 29, 2006

(65) Prior Publication Data

US 2008/0082329 A1    Apr. 3, 2008

(51) Int. Cl.
*G10L 15/26* (2006.01)
(52) U.S. Cl. .................. 704/235; 704/231; 704/246; 704/251; 704/270
(58) Field of Classification Search ............ 704/235, 704/231, 251, 246, 270
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |

(Continued)

FOREIGN PATENT DOCUMENTS

CA    2502533    4/2004

(Continued)

OTHER PUBLICATIONS

"Customer Spotlight: Navistar International," Web pae, unverified print date of Apr. 1, 2002.

(Continued)

*Primary Examiner*—Qi Han
(74) *Attorney, Agent, or Firm*—Lawrence A. Aaronson, P.C.

(57) ABSTRACT

Included are embodiments for multi-pass analytics. At least one embodiment of a method includes receiving audio data associated with a communication, performing first tier speech to text analytics on the received audio data, and performing second tier speech to text analytics on the received audio.

25 Claims, 16 Drawing Sheets

U.S. PATENT DOCUMENTS

| | | |
|---|---|---|
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0046023 A1* | 4/2002 | Fujii et al. ................. 704/231 |
| 2002/0046206 A1* | 4/2002 | Obuchi et al. ................. 707/3 |
| 2002/0052948 A1 | 5/2002 | Baudu et al. |
| 2002/0065911 A1 | 5/2002 | von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0046083 A1* | 3/2003 | Devinney et al. ........... 704/273 |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0254791 A1 | 12/2004 | Coifman et al. |
| 2004/0264652 A1 | 12/2004 | Erhart et al. |
| 2005/0010422 A1* | 1/2005 | Ikeda et al. ................. 704/277 |
| 2005/0138560 A1 | 6/2005 | Lee et al. |
| 2007/0027693 A1* | 2/2007 | Hanazawa ................. 704/275 |
| 2007/0198267 A1* | 8/2007 | Jones et al. ................. 704/257 |
| 2009/0018834 A1* | 1/2009 | Cooper et al. ............... 704/257 |

FOREIGN PATENT DOCUMENTS

| | | |
|---|---|---|
| EP | 0453128 A2 | 10/1991 |

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 ( © 2001).

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,*" *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10$^{th}$ Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, Mar. 28, 1996.

Kenny. *TV Meets Internet*, PC World Online, Mar. 28, 1996.

Linderholm. *Avatar Debuts Home Theater PC*, PC World Online, Dec. 1, 1999.

Rohde. *Gates Touts Interactive TV*, InfoWorld, Oct. 14, 1999.

Ross. *Broadcasters Use TV Signals to Send Data*, Pc World Oct. 1996.

Stewart. *Interactive Television at Home: Television Meets the Internet*, Aug. 1998.

Wilson. *U.S. West Revisits Interactive TV*, Interactive Week, Nov. 28, 1999.

* cited by examiner

MULTI-PASS SPEECH ANALYTICS

BACKGROUND

As communication technologies have improved, businesses and individuals have desired greater functionality in their communication networks. As a nonlimiting example, many businesses have created call center infrastructures in which a customer or other user can call to receive information related to the business. As customers call into the call center, the customer may be connected with a customer service representative to provide the desired information. Depending on the time of call, the subject matter of the call, and/or other data, the customer may be connected with different customer service representatives. As such, depending on these and/or other factors, the customer may be provided with varying levels of customer service with respect to the interaction with the customer service representative. Because most businesses desire to provide the highest possible quality of customer service, many businesses have turned to recording the communication between the customer and the customer service representative. While recording this data has proven beneficial in many cases, many businesses receive call volumes that inhibit the business from reviewing all of the call data received.

As such, many businesses have turned to speech recognition technology to capture the recorded communication data and thereby provide a textual document for review of the communication. While textual documentation of a communication has also proven beneficial, similar issues may exist in that the sheer amount of data may be such that review of the data is impractical.

To combat this problem, a number of businesses have also implemented analytics technologies to analyze the speech-recognized communications. One such technology that has emerged includes large vocabulary continuous speech recognition (LVCSR). LVCSR technologies often convert received audio from the communications into an English translation of the communication in a textual document. From the textual document, analytics may be provided to determine various data related to the communication. Additionally, phonetic speech recognition may be utilized for capturing the communication data.

While these and technologies may provide a mechanism for capturing communication data, oftentimes, the shear amount of data for processing may consume extensive hardware resources. As such, a solution to increase speed and/or reduce resource consumption is desired.

SUMMARY

Included are embodiments for multi-pass analytics. At least one embodiment of a method includes receiving audio data associated with a communication, performing first tier speech to text analytics on the received audio data, and performing second tier speech to text analytics on the received audio.

Also included are embodiments of a system for multi-pass analytics. At least one embodiment of a system includes a receiving component configured to receive audio data associated with a communication and a first tier speech to text analytics component configured to perform first tier speech to text analytics on the received audio data. Some embodiments include a second tier speech to text analytics component configured to, in response to determining, perform second tier speech to text analytics on the received audio.

Also included are embodiments of a computer readable medium for multi-pass analytics. At least one embodiment includes receiving logic configured to receive audio data associated with a communication and first tier speech to text analytics logic configured to perform first tier speech to text analytics on the received audio data. Some embodiments include second tier speech to text analytics logic configured to, in response to determining, perform second tier speech to text analytics on the received audio.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included are embodiments for increasing the speed of speech to text conversion and related analytics. More specifically, in at least one embodiment, first tier speech to text analytics and second tier speech to text analytics are used. In other embodiments, a first tier may be configured for speech to text conversion and a second tier may be configured for speech to text analytics. Other embodiments are also included, as discussed with reference to the drawings.

Figure 1:
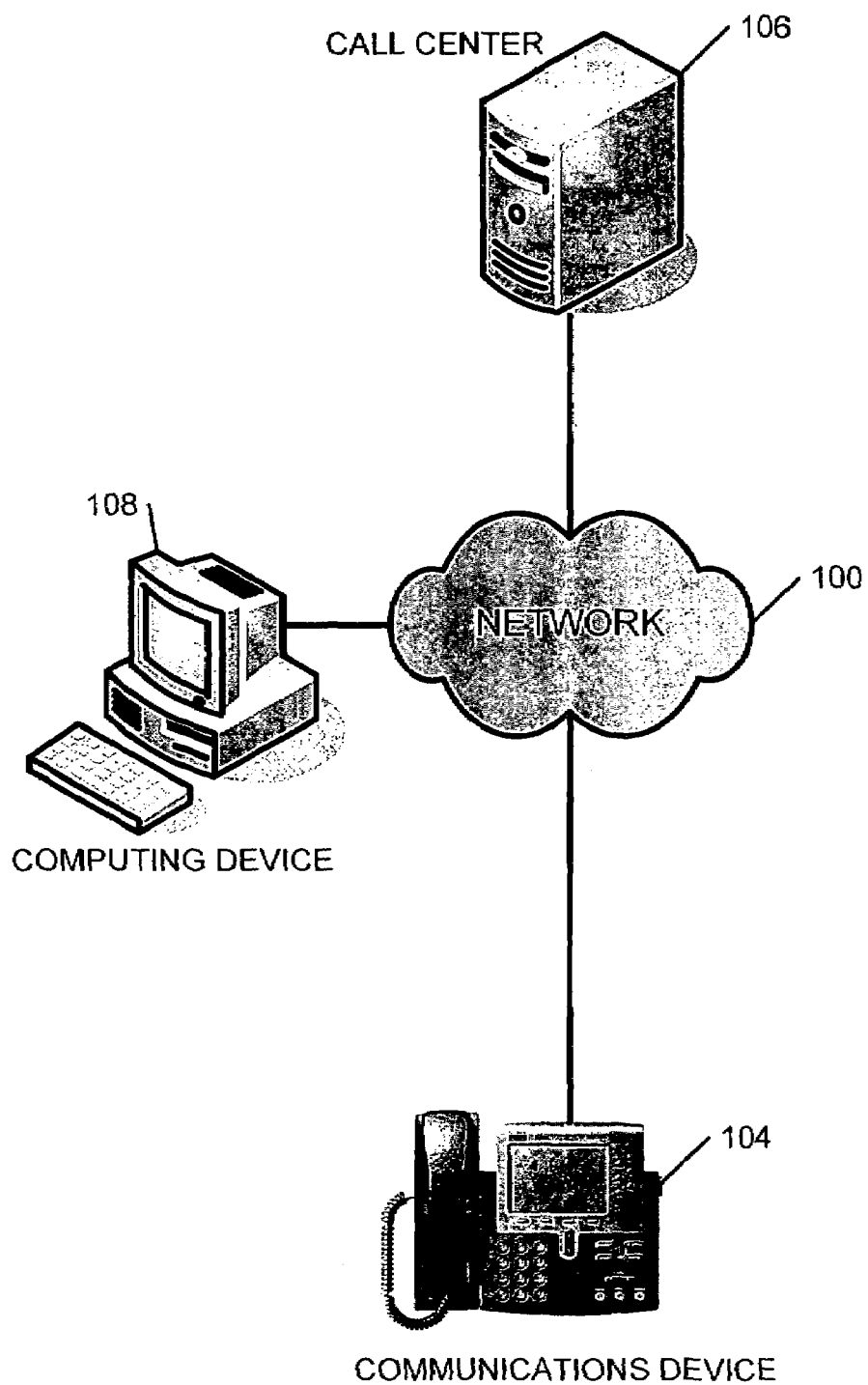
FIG. 1 is an exemplary embodiment of a system in which a user may be provided with customer service.

FIG. 1 is a nonlimiting example of a system in which a user may be provided with customer service. As illustrated in this nonlimiting example, a caller can initiate a communication request from a communications device 104. The communications request can be sent to call center 106 via network 100. Network 100 may include a Public Switched Telephone Network (PSTN), an Internet Protocol (IP) network, a cellular network, an Integrated Services Digital Network (ISDN), a Time Division Multiplexing (TDM) network, and/or other networks. Upon connecting with call center 106, a user at communications device 104 may facilitate a communication with a customer service representative. Additionally, during the communication, the communication can be recorded, such that a business associated with call center 106 can determine the quality of customer service provided to the user of communications device 104.

While in some configurations, an audio recording can be provided to an analyst to determine the quality of customer service, some embodiments may include a text to voice conversion of the communication. Large Vocabulary Continuous Speech Recognition (LVCSR) may be utilized to create an English translated textual document associated with the communication. While an LVCSR speech recognized textual document may provide enhanced searching capabilities related to the communication, depending on an accuracy threshold, LVCSR technologies may be slow in execution. Similarly, in many phonetic technologies for speech recognition, processing of search functions associated with the communication may be slow.

Additionally, while a user can send a communication request via communication device 104, some embodiments may provide that a user utilizing computing device 108 may initiate a communication to call center 106 via network 100. In such configurations, a user may utilize a soft phone and/or other communications logic provided for initiating and facilitating a communication.

One souls also note that a call center can include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Figure 2:
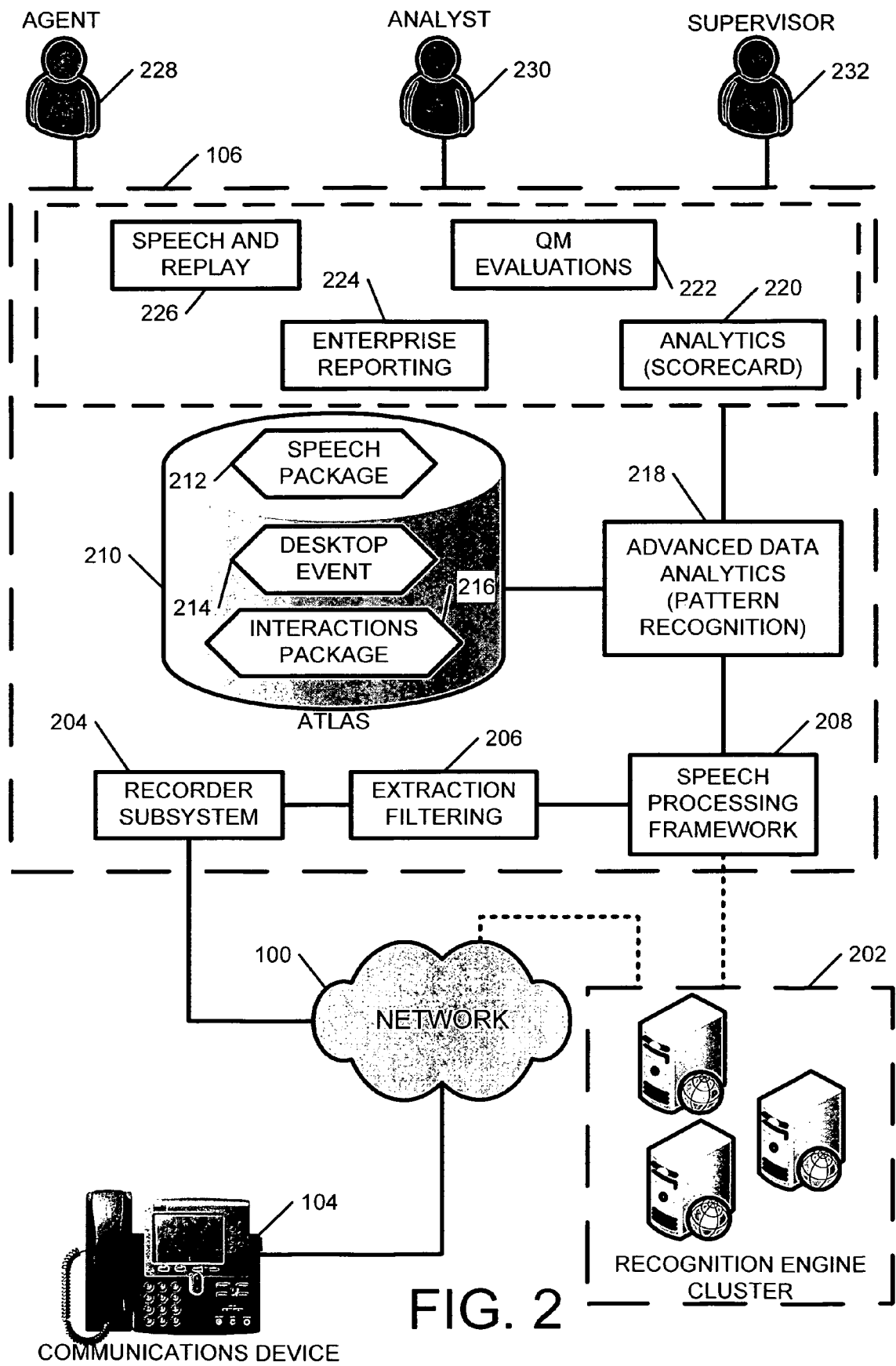
FIG. 2 is an exemplary embodiment of a recording network configuration, in which recording and analytics may be provided, similar to the network configuration from FIG. 1.

FIG. 2 is a nonlimiting example of a system for providing recording and analytics, similar to the network configuration from FIG. 1. As illustrated in the nonlimiting example of FIG. 2, communications device 104 can facilitate communications with call center 106 via network 100. Call center 106 can include one or more elements, such as a recorder subsystem component 204, an extraction filtering component 206, and a speech processing firmware component 208. Also included in call center 106 is an advanced data analytics (pattern recognition) component 218 and an atlas component 210. Included in the atlas component 210 is a speech package 212, a desktop event 214, and an interactions package 216.

Call center 106 may also include an analytic scorecard 220, a quality management (QM) evaluations component 222, and enterprise reporting component 224, and a speech and replay component 226. An agent 228 can utilize one or more of the components of call center 106 to facilitate a communication with a caller on communications device 104. Similarly, an analyst 230 can utilize one or more components of call center 106 to analyze the quality of the communications between the agent 228 and the caller associated with communications device 104. A supervisor 232 may also have access to components of call center 106 to oversee the agent 228 and/or the analyst 230 and their interactions with a caller on communications device 104.

Additionally, a recognition engine cluster 202 may be coupled to call center 106 directly and/or via network 100. Recognition engine cluster 202 may include one or more servers that may provide speech recognition functionality to call center 106. In operation, a communication between a caller on communications device 104 and an agent 228, via network 100, may first be received by a recorder subsystem component 204. Recorder subsystem component 204 may record the communications in an audio format. The recorder audio may then be sent to an extraction filtering component 206 which may be configured to extract the dialogue (e.g., remove noise and other unwanted sounds) from the recording. The recorded communication can then be sent to a speech-processing framework component 208 for converting the recorded audio communication into a textual format. Conversion of the audio into a textual format may be facilitated by a recognition engine cluster 202, however this is not a requirement. Regardless, conversion from the audio format to a textual format may be facilitated via LVCSR speech recognition technologies and/or phonetic speech recognition technologies, as discussed in more detail below.

Upon conversion from audio to a textual format, data related to the communication may be provided to advanced data analytics (pattern recognition) component 218. Advanced data analytics component 218 may be configured to provide analysis associated with the speech to text converted communication to determine the quality of customer service provided to the caller of communications device 104. Advanced data analytics component 218 may utilize atlas component 210 for facilitation of this analysis. More specifically, atlas component 210 may include a speech package component 212 that may be configured to analyze various patterns in the speech of the caller of communications device 104. Similarly, desktop event component 214 may be configured to analyze one or more actions that the user of communications device takes on their communications device 104. More specifically, a network 100 may facilitate communications in an IP network. As such, communications device 104 may facilitate both audio and/or data communications that may include audio, video, images, and/or other data. Additionally, advanced data analytics component 218 may utilize an actions package 216 to determine various components of the interaction between agent 228 and the caller of communications device 104. Advanced data analytics component 218 may then make a determination based on predetermined criteria of the quality of call service provided by agent 220.

Advanced data analytics component 218 may then facilitate creation of an analytic scorecard 220 and provide enterprise reporting 224. Additionally, call center may provide quality management evaluations 222, as well as speech and replay communications 226. This data may be viewed by an agent 228, an analyst 230, and/or a supervisor 232. Additionally, as discussed in more detail below, an analyst 230 may further analyze the data to provide a basis for advanced data analytics component 218 to determine the quality of customer service.

Figure 3:
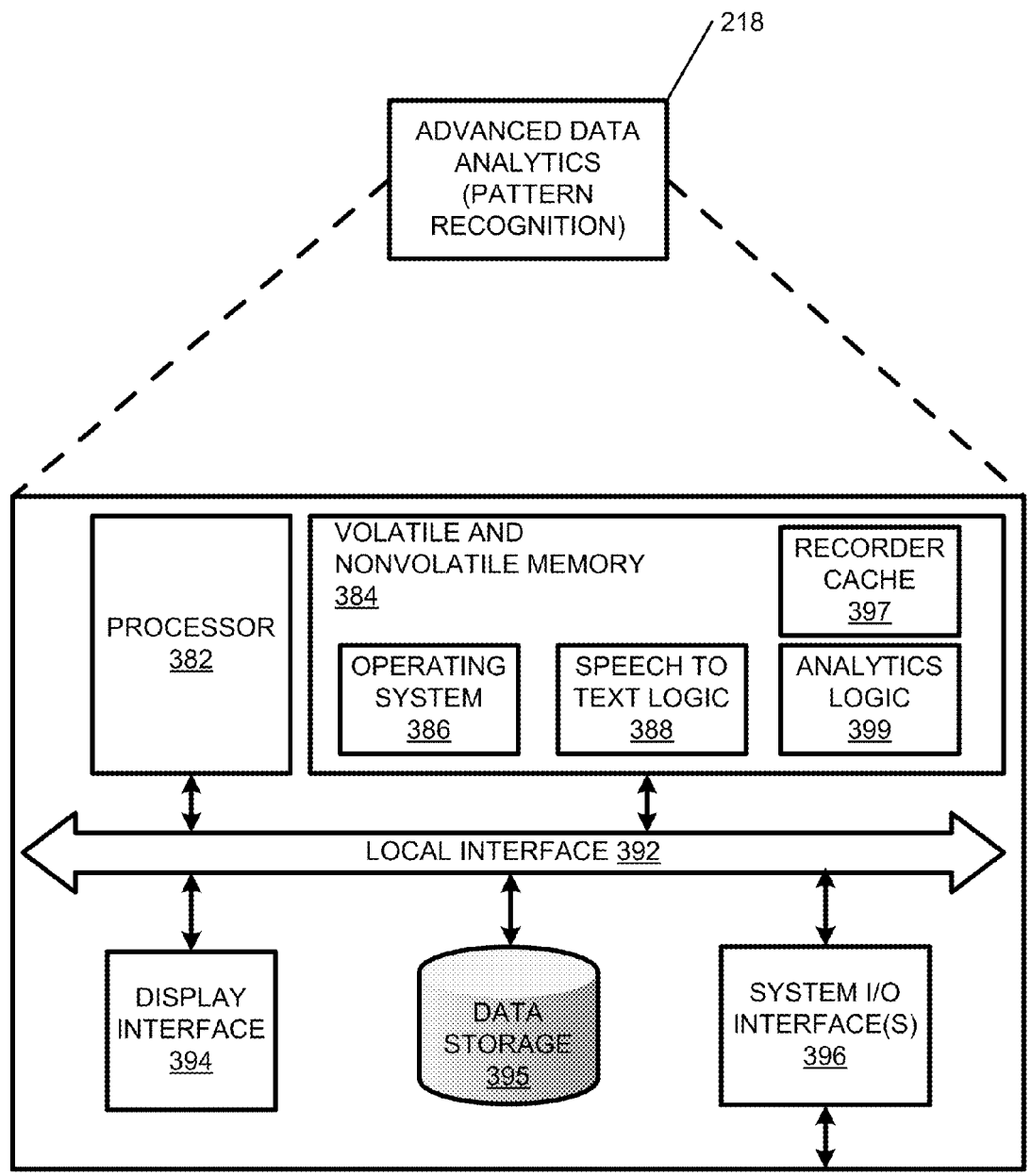
FIG. 3 is a functional block diagram illustrating an exemplary embodiment of an analytic component, similar to the analytic component from FIG. 2.

FIG. 3 is a functional block diagram illustrating an analytic component, similar to the analytic component from FIG. 2. Although a wire-line communications device is illustrated, this discussion can be applied to any device configured for receiving and/or sending data. As illustrated in FIG. 3, in terms of hardware architecture, advanced data analytics component 218 includes a processor 382, volatile and nonvolatile memory 384, a display interface 394, data storage 395, and one or more input and/or output (I/O) device interface(s) 396 that are communicatively coupled via a local interface 392. The local interface 392 can include, for example but not limited to, one or more buses and/or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a hardware device for executing software, particularly software stored in volatile and nonvolatile memory 384.

The processor 382 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing software instructions.

The volatile and nonvolatile memory 384 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory 384 may incorporate electronic, magnetic, optical, and/or other types of storage media. Note that the volatile and nonvolatile memory 384 can also have a distributed architecture, where various components are situated remotely from one another, but can be accessed by the processor 382.

The software in volatile and nonvolatile memory 384 may include one or more separate programs, each of which includes an ordered listing of executable instructions for implementing logical functions. In the example of FIG. 3, the software in the volatile and nonvolatile memory 384 may include speech to text logic 388, analytics logic 399, as well as an operating system 386, and a recording cache 397. Additionally, while logic components 386, 388, and 390 are each illustrated in this nonlimiting example as a single piece of logic, as one of ordinary skill in the art will understand, these components can include one or more separate software, hardware, or firmware modules. Similarly, one or more of these logical components can be combined to provide the desired functionality. Additionally, the operating system 386 may be configured to control the execution of other computer programs and may be configured to provide scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the Operating System 386.

The Input/Output devices that may be coupled to system I/O Interface(s) 396 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 388, which is coupled to local interface 392 can be configured to communication with a communications network, such as the network from FIGS. 2 and 3. While this communication may be facilitated via a communications device, such as communications device 106, this is not a requirement.

If the computing device 104 is a personal computer, workstation, or the like, the software in the volatile and nonvolatile memory 384 may further include a basic input output system (BIOS) (omitted for simplicity). The BIOS is a set of software routines that initialize and test hardware at startup, start the Operating System 386, and support the transfer of data among the hardware devices. The BIOS is stored in ROM so that the BIOS can be executed when the computing device 104 is activated.

When the computing device 104 is in operation, the processor 382 can be configured to execute software stored within the volatile and nonvolatile memory 384, to communicate data to and from the volatile and nonvolatile memory 384, and to generally control operations of the computing device 104 pursuant to the software. Software in memory, in whole or in part, is read by the processor 382, perhaps buffered within the processor 382, and then executed. Additionally, one should note that while the above description is directed to a advanced data analytics component 218, other devices (such as communications device 104, computing device 108, call center 106, and/or other components) can also include the components and/or functionality described in FIG. 3.

One should also note that advanced data analytics component 218 can be configured with one or more of the components and/or logic described above with respect to analytics component 218. Additionally, analytics component 218, communications device 104, computing device 108, and/or other components of call center 106 can include voice recognition logic, voice-to-text logic, text-to-voice logic, etc. (or any permutation thereof), as well as other components and/or logic for facilitating the functionality described herein. Additionally, in some exemplary embodiments, one or more of these components can include the functionality described with respect to analytics component 218.

Figure 4:
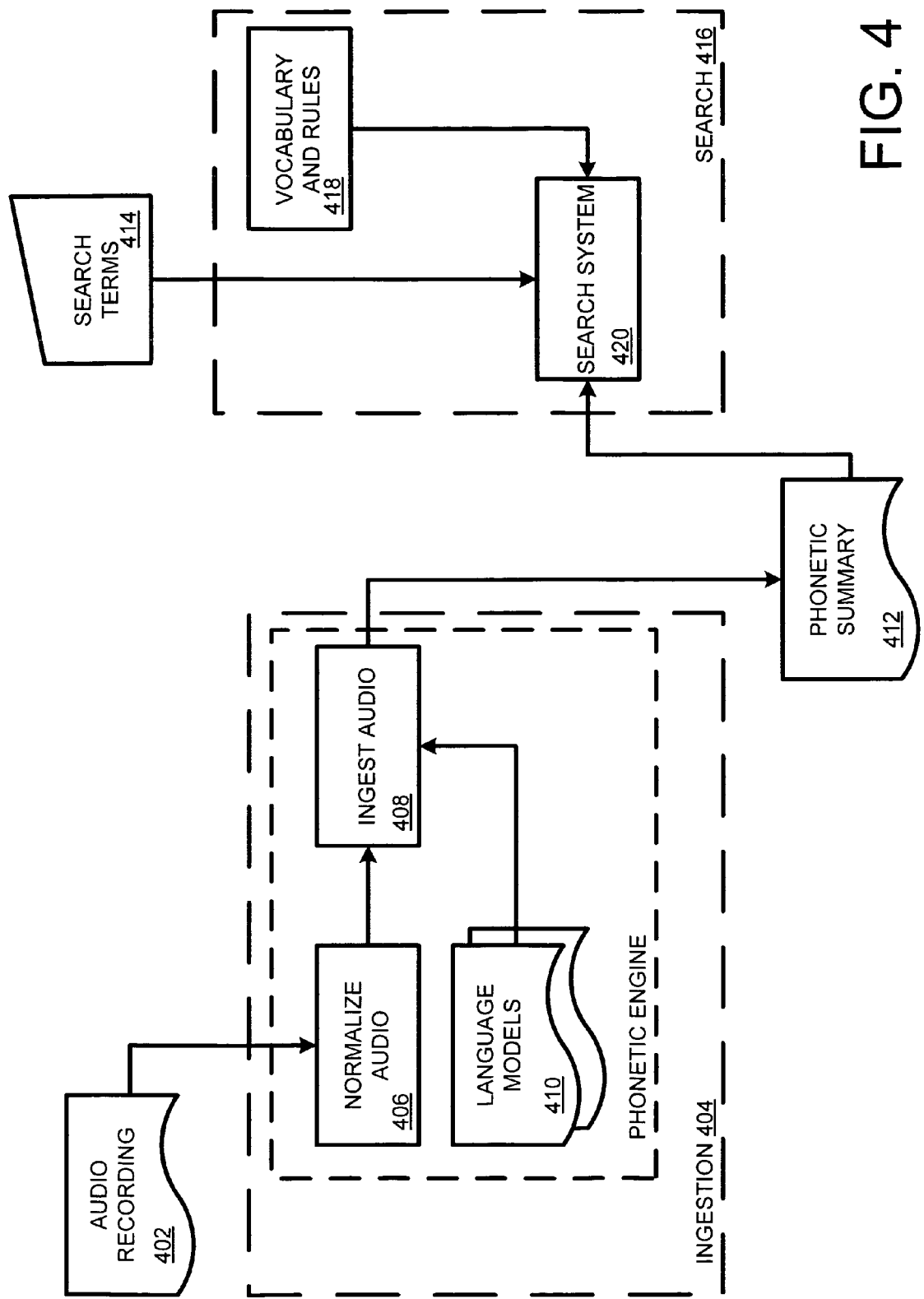
FIG. 4 is an exemplary embodiment of a functional flow diagram, illustrating components that may be utilized for a phonetics based analytic infrastructure, as may be utilized in the network of FIG. 1.

FIG. 4 is an exemplary functional flow diagram, illustrating components that may be utilized for a phonetics based analytic infrastructure, as may be utilized in the network of FIG. 1. As illustrated in the nonlimiting example of FIG. 4, the components of FIG. 4 may be included as part of call center 106. More specifically, speech recognition processing component 208 can receive an audio recording via extraction filtering component 206 and recorder subsystem component 204. Speech processing framework 208 may receive this data in an ingestion component 404 and more specifically in a normalized audio component 406. A normalized audio component 406 may be configured to facilitate the digitizing and or other processing of an audio recording. Additionally, the normalized audio component 406 (which may be part of the phonetic engine) can send normalized audio to an ingest audio component 408. The ingest audio component 408 may be configured to receive the normalized audio and one or more language models 410 for ingesting the communications data into a phonetic transcript.

More specifically, ingest audio component 408 can be configured to facilitate the creation of a phonetic transcript with one or more phonemes that occur in the communication. One embodiment of a representation of the one or more phonemes can include the designation of International Phonetic Alphabet (IPA) which may be utilized for computer use using the ISO10646 standard (UNICODE). Ingest audio component 408 can then create the phonetic transcript 412.

The phonetic transcript 412 can then be sent to a search system 420, which is part of a search component 416. The search system can also receive vocabulary and rules as designated by an analyst, such as analyst 230 from FIG. 2. Vocabulary and rules component 418 can designate one or more search trends and/or algorithms to perform in analyzing the phonetic transcript 412. Additionally, search terms 414 may be provided by analyst 230 to provide data associated with the quality of customer service provided to a caller.

As a nonlimiting example, referring to FIGS. 2 and 4, a user of communications device 104 may initiate communication with call center 106. The user of communications device 104 and an agent 228 may engage in a communication that includes the phrase "brown fox." In this communication, the agent 228 may be required to save the term "brown fox." As such, the communication can be recorded and the audio recording 402 can be sent to the base phonetic engine. The phonetic engine can apply language models 410 to ingest the audio recording at ingest audio component 408. The phonetic engine can thereby create a phonetic transcript 412.

The phonetic transcript can then be sent to a search component 416, which includes a search system 420. The search system 420 can utilize vocabulary and rules component 418, as well as receive the search terms 414. As indicated above, the search term "brown fox" can be a desired term to be found in a communication. The search system 420 can then search the phonetic transcript for the term "brown fox." As the phonetic transcript may not include an English translation of the audio recording, vocabulary and rules component 418 may be configured to provide a correlation between the search term 414 (which may be provided in English) and the phonetic representation of the desired search terms.

If the term "brown fox" appears in the phonetic transcript 412, a signal and/or scorecard can be provided to an analyst 230 to determine the quality of customer service provided by agent 228. Additionally, some embodiments can be configured to provide information to analyst 230 in the event that the term "brown fox" does not appear in the communication. Similarly, other search terms and/or search criteria may be utilized to provide data to analyst 230. Further description of phonetic speech to text conversion and analytics is disclosed in U.S. application Ser. No. 11/540,281, entitled "Speech Analysis Using Statistical Learning," which is hereby incorporated by reference in its entirety.

Figure 5:
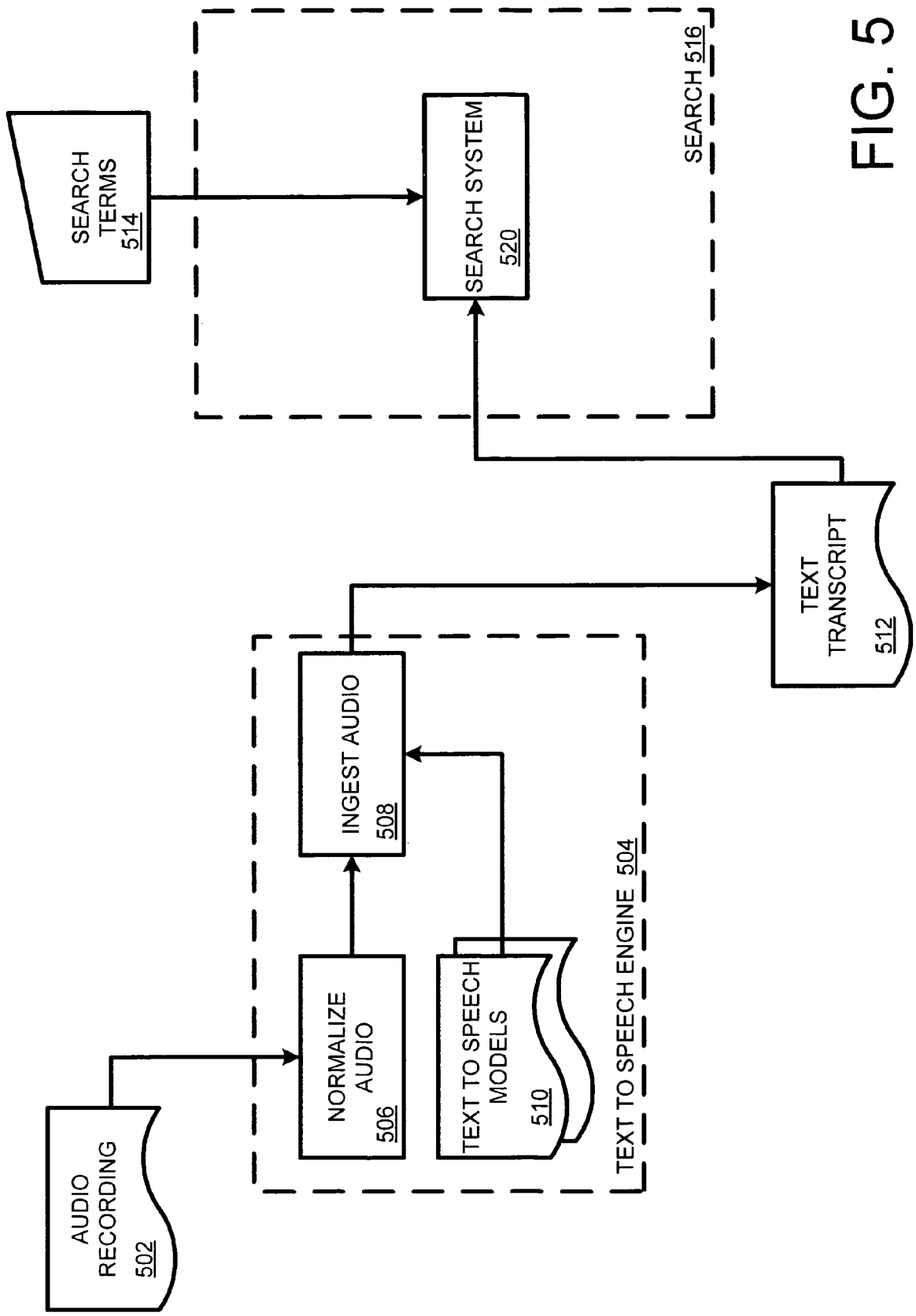
FIG. 5 is an exemplary embodiment of a functional block diagram illustrating speech recognition according to a text speech engine, similar to the diagram from FIG. 4.

FIG. 5 is an exemplary functional block diagram illustrating speech recognition according to a text speech engine, similar to the diagram from FIG. 4. As illustrated in the nonlimiting example of FIG. 5, an audio recording 502 may be provided to a text to speech engine 504, where a normalized audio component 506 may receive an audio recording, normalize the audio recording, and provide the normalized audio recording to an ingest audio component 508. Ingest audio component 508 can receive the normalized audio data, as well as text speech models 510. Ingest audio component 508 may be configured to then convert the received audio recording into a textual transcript in a desired spoken language format (English, Spanish, French, etc.). The textual transcript 512 may then be provided to a search component 516. Search system 512 (which may be part of search system 516), may receive the text transcript 512, as well as search terms 514. With search terms 514 and text transcript 512, search component 516 may be configured to determine the quality of a communication between an agent and a customer.

One should note that the nonlimiting example of FIG. 5 may be included as part of call center 106. More specifically, in at least one exemplary embodiment, one or more of the components of FIG. 5 may be included with speech processing framework 208, advanced data analytics component 218, and/or other components. Similarly, depending on the particular configuration, at least a portion of this logic may be provided with communications device 106 and/or computing device 108.

Figure 6:
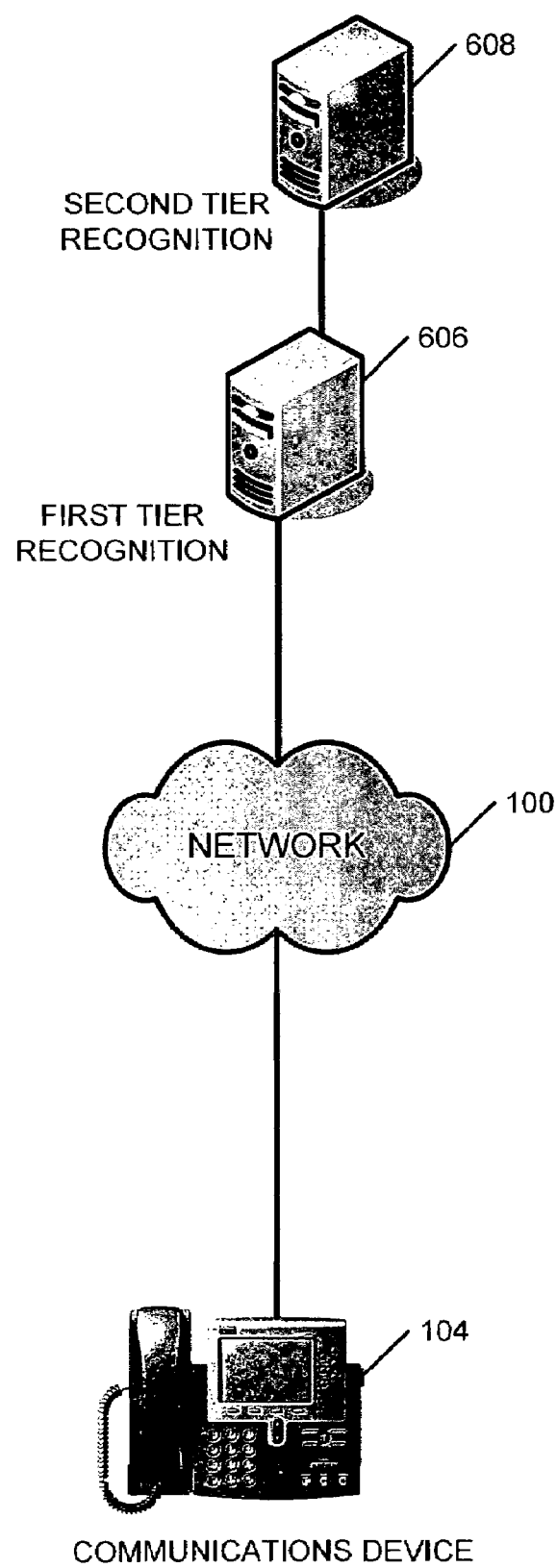
FIG. 6 is a network diagram illustrating an exemplary embodiment of a multi-tier speech recognition configuration, similar to the network configuration from FIG. 1.

FIG. 6 is a network diagram illustrating a multi-tier speech recognition configuration, similar to the network configuration from FIG. 1. As illustrated in the nonlimiting example of FIG. 6, communications device 104 may be coupled with local network 100. Additionally, a first tier recognition server 606 may be coupled to network 100. Additionally, a second tier speech recognition server 608 may be coupled to first tier recognition server 606. In operation, first tier recognition server may be configured to receive audio data associated with a communication between a user of communications device 104 and an agent 228 associated with a call center 106. First tier recognition server 606 may include a phonetic recognition server and/or a LVCSR server with a reduced accuracy rate. Regardless, first tier recognition server is configured to operate in an expedited mode, such that speech recognition and analytics of the received communication data is provided.

In at least one embodiment, the system of FIG. 6 may be configured such that first tier recognition server 606 is configured to provide speech to text conversion for received audio data. First tier recognition server 606 may be configured to convert speech to text via a phonetic engine (such as the phonetic engine described in FIG. 4) and/or via LVCSR (such as described in FIG. 5). In such a configuration, second tier recognition server 608 may be configured to provide one or more speech to text analytics for the converted audio data. This may facilitate faster operation of the network in that first tier server 606 may be configured to, in at least one embodiment, process data faster than second tier server 608. This may be accomplished via a faster computer architecture, utilization of faster speech to text recognition logic, and/or for other reasons. Similarly, some embodiments may be configured such that first tier server 606 is configured to determine the data to be sent to second tier server 608. As a subset of data received at first tier server 606 is sent to second tier server 608, the overall network performance may improve.

Similarly, some embodiments may be configured such that first tier recognition server 606 is configured to provide a precursory speech to text conversion and/or analytics. Upon recognition of a desired search term associated with the communication, first tier recognition server 606 can provide at least a portion of the communication data to second tier recognition server 608. Second tier recognition server 608 may be configured to provide a more thorough analysis (and/or conversion) of the data. As first tier server 606 may be configured to process at least a portion of the received data and send at least a portion of that data to second tier server 608, network performance may improve.

While first tier recognition server 606 is illustrated as being directly coupled to second tier recognition server 608, this is a nonlimiting example. More specifically, in at least one embodiment, first tier recognition server is coupled to network 100 and second tier recognition server is also coupled to network 100. First tier recognition server 606 may be separately located from second tier recognition server and may facilitate communications with second tier recognition server 608 via network 100. Additionally, while first tier recognition server 606 and second tier recognition server 608 are illustrated as separate components, this is also a nonlimiting example. In at least one embodiment, the functionality described with respect to first tier recognition server 606 and second tier recognition server 608 may be provided in a single component for providing the desired functionality.

Figure 7:
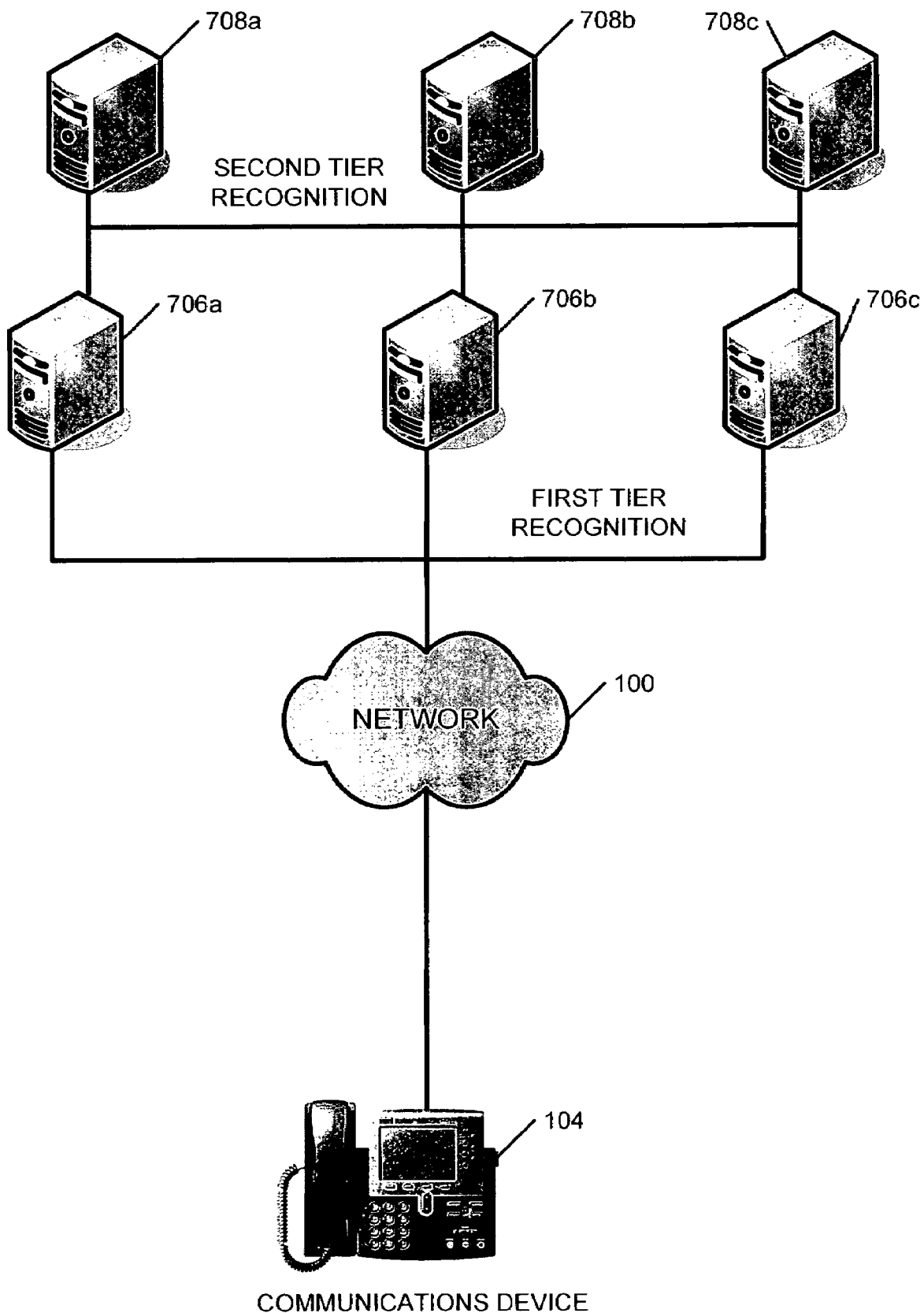
FIG. 7 is a network configuration illustrating an exemplary embodiment of a multi-tier speech recognition configuration with a plurality of servers, similar to the network configuration from FIG. 6.

FIG. 7 is an exemplary network configuration illustrating a multi-tier speech recognition configuration with a plurality of servers, similar to the network configuration from FIG. 6. As illustrated in the nonlimiting example of FIG. 7, communications device 104 is coupled to network 100. Also coupled to network 100 are first tier recognition servers 706a, 706b, and 706c. Similarly, coupled to first tier recognition servers 706 are first tier recognition server 708a, 708b, and 708c.

First tier recognition server 706 may be configured to provide one or more speech recognition and/or analytics services. As a nonlimiting example, first tier recognition server 706a may be configured to determine speaker identification associated with the communication. Similarly, first tier server 706b may be configured to provide speaker verification associated with the communication. First tier server 706c may be configured to determine speaker emotion. Similarly, second tier speech recognition service 708a may be configured to exclusively serve first tier recognition server 706a, however this is a nonlimiting example. More specifically, second tier speech recognition server 708a may be configured as a speaker identification determination server to receive data from first recognition server 706a. In operation, audio data may be sent to first tier speech recognition server 706a, which may be a phonetic speech recognition server. First tier speech recognition server 706a may be configured to determine at least one characteristic associated with the audio data to determine whether speaker identification may be determined. If a determination is made that speaker identification can be determined, first tier speech recognition service 706a may send at least a portion of the received audio data (which may be converted into a phonetic transcript and/or other form) to a second tier recognition server 708a. Second tier speech recognition server 708a may be configured to fully analyze the received data to determine the identification of the speaker.

While the nonlimiting example discussed above indicates that the second tier speech recognition server 708a is a dedicated server for first tier speech recognition server 706a, this is a nonlimiting example. More specifically, in at least one nonlimiting example, second tier recognition servers may serve one or more of the first tier speech recognition servers 706. Similarly, some embodiments can be configured such that first tier recognition server 706 may be configured to provide the initial speech recognition functionality while second tier speech recognition server 708 may be configured to provide more specific services. In this nonlimiting example, first tier speech recognition servers 706a, 706b, 706c may be configured to provide a speech to text conversion associated with received audio data. Upon conversion, first tier speech recognition servers 706a, 706b, and 706c can make a determination as to the desired analytics for the associated communication. Upon determining the desired analytics, first tier speech recognition server 706 can send the phonetic data to a second tier speech recognition server 708 associated with the desired analytic.

More specifically, if second tier speech recognition server 708a is a speaker identification server, one or more of the first tier recognition servers 706a, 706b, 706c can send data to second tier speech recognition server 708a upon determination that a speaker identification is required. Similarly, if second tier speech recognition server 708b is configured for speaker verification, speech recognition servers 706 may be configured to send communication data to second tier speech recognition server 708b. Other configurations are also included.

Figure 8:
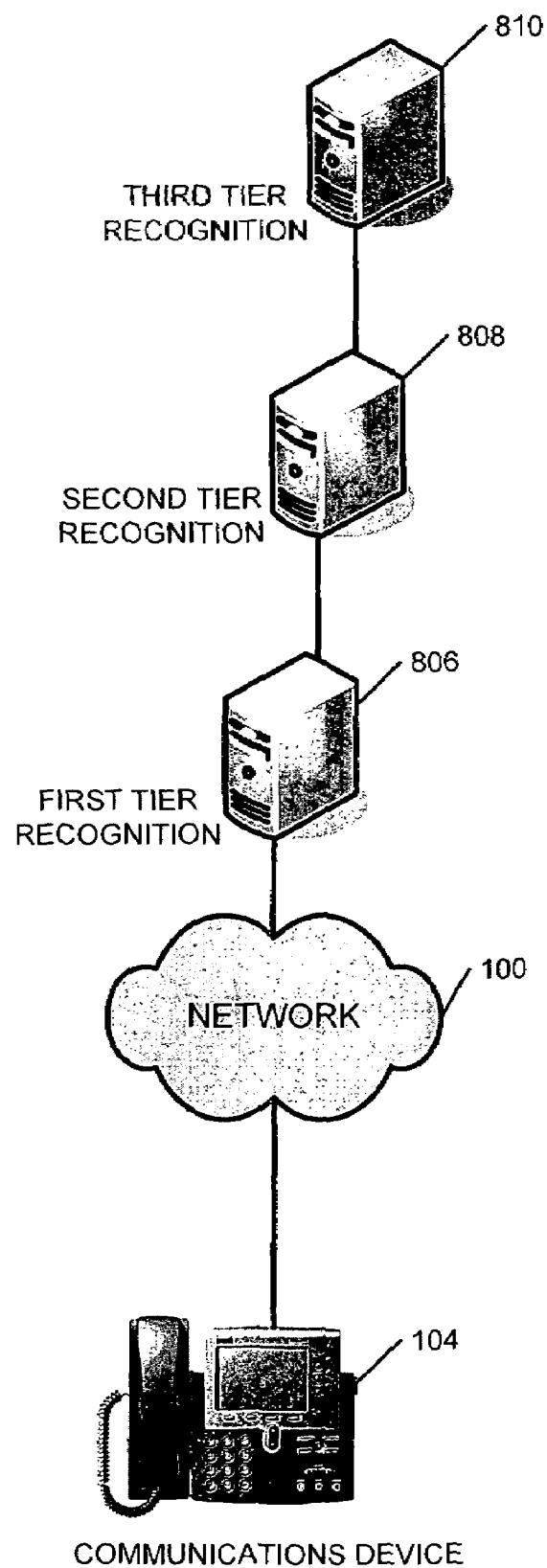
FIG. 8 is a network configuration illustrating an exemplary embodiment of a three-tier speech recognition configuration, similar to the network configuration from FIG. 7.

FIG. 8 is an exemplary network configuration illustrating a three-tier speech recognition configuration, similar to the network configuration from FIG. 7. As illustrated in the nonlimiting example of FIG. 8, communications device 104 is connected to network 100. Also connected to network 100 is a first tier speech recognition server 806. As illustrated in the previous nonlimiting examples, first tier speech recognition server 806 may be configured to provide expedited speech recognition services via a phonetics speech to text configuration and/or an LVCSR functionality with reduced accuracy such that processing of the audio data may be completed in an expedited manner.

Also included in the nonlimiting example of FIG. 8 is a second tier speech recognition server 808. Second tier speech recognition server 808 may be configured to provide speech recognition services at higher accuracy than first tier speech recognition server 806. Similarly, FIG. 8 also includes a third tier recognition server 810, which may be configured to further speech recognition analytics associated with the communication.

In operation, first tier speech recognition server 806 may be configured to receive raw data associated with a communication. First tier speech recognition server 806 may then perform expedited speech recognition services on the received data. Second tier speech recognition server 808 may include more thorough speech recognition functionality which may be slower in operation than first tier speech recognition server 806, however second tier server 808 may provide greater accuracy related to received data. Additionally, second tier speech recognition server 808 may make a determination whether a third tier speech recognition server 810 may be utilized.

Third tier speech recognition server 810 may be configured to provide services different than that of second tier speech recognition server 808. As a nonlimiting example, second tier speech recognition server 808 may be configured to determined speaker confidence associated with received audio data, while a third tier speech recognition server may be configured to determine speaker emotion associated with the received audio. As such, if information regarding both speaker emotion and speaker confidence is desired, the second tier speech recognition server 808 and third tier speech recognition server 810 (as well as first tier speech recognition server 806) may be utilized.

Figure 9A:
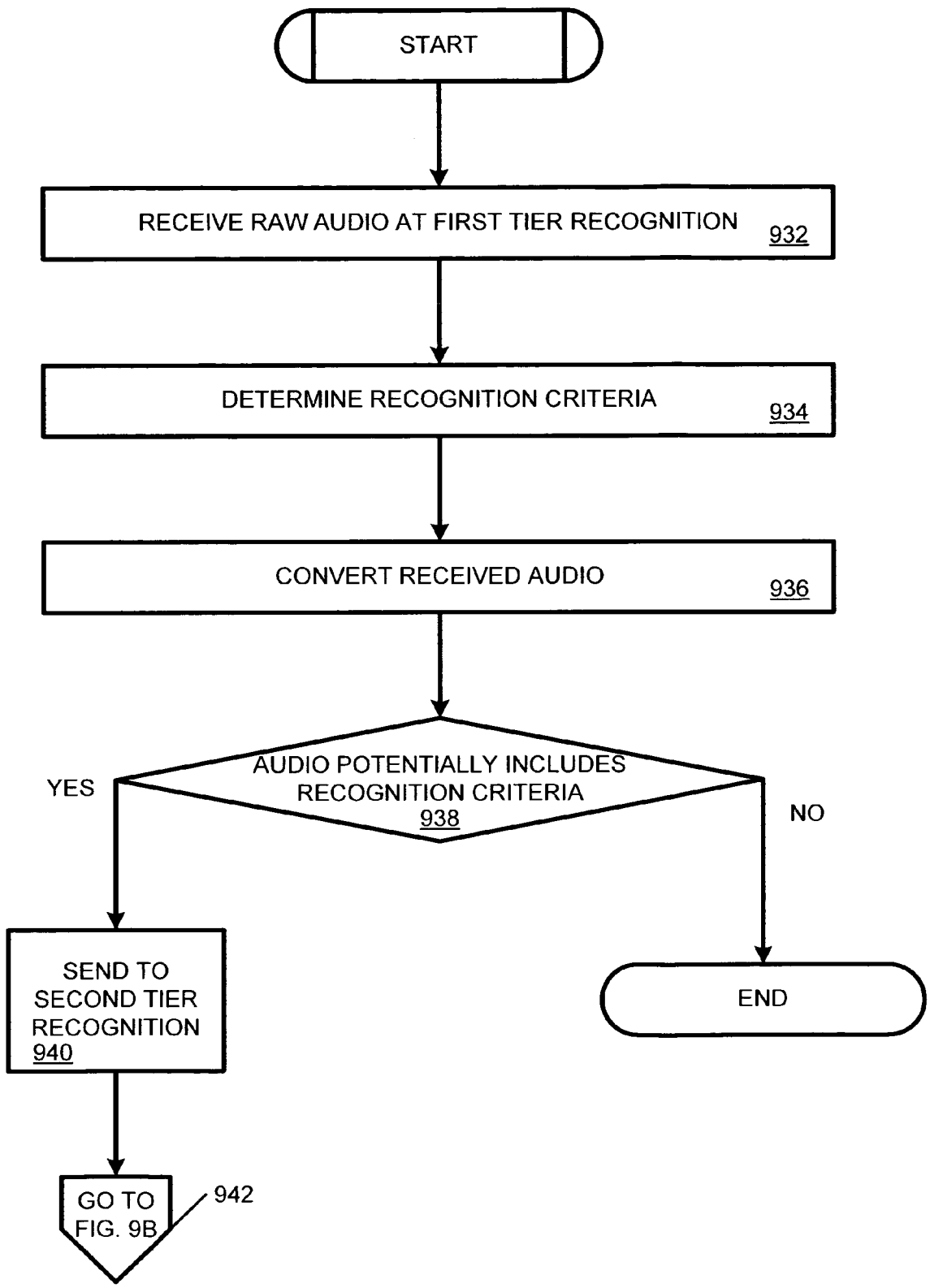
FIG. 9A is a flowchart illustrating the exemplary embodiment of a process that may be utilized to perform speech recognition functionality in a multi-tier speech recognition environment, such as the environment from FIG. 6.

FIG. 9A is a flowchart illustrating an exemplary embodiment of a process that may be utilized to perform speech recognition functionality in a multi-tier speech recognition environment, such as the environment from FIG. 6. As illustrated in the nonlimiting example of FIG. 9A, call center 106 may receive raw audio data associated with a communication on a first tier speech recognition server (block 932). Call server 106 may then determine recognition criteria (block 934). More specifically, call center 106 may be configured to determine the type of speech recognition analysis that may be performed on the received communication data. As a nonlimiting example, the received communication call center 106 may determine that the first tier speech recognition server determines speaker identification associated with communication. This indication may be received from an agent 228, analyst 230, and/or supervisor 232, depending upon the embodiment.

Call center 106 may then convert the received audio into a textual transcript (e.g., a phonetic transcript and/or a spoken language transcript and/or other type of transcript), as illustrated in block 936. Call center 106 may then determine whether the audio potentially include the recognition criteria (block 938). If the received audio data does not include the recognition criteria, the process may end. If, however, first tier speech recognition server determines that the audio potentially include the recognition criteria, first tier speech recognition server can send at least a portion of the audio (which may be converted to a phonetic and/or other transcript) to second tier speech recognition server (block 938). The flowchart then proceeds to jump block 940, which is continued in FIG. 9B.

Figure 9B:
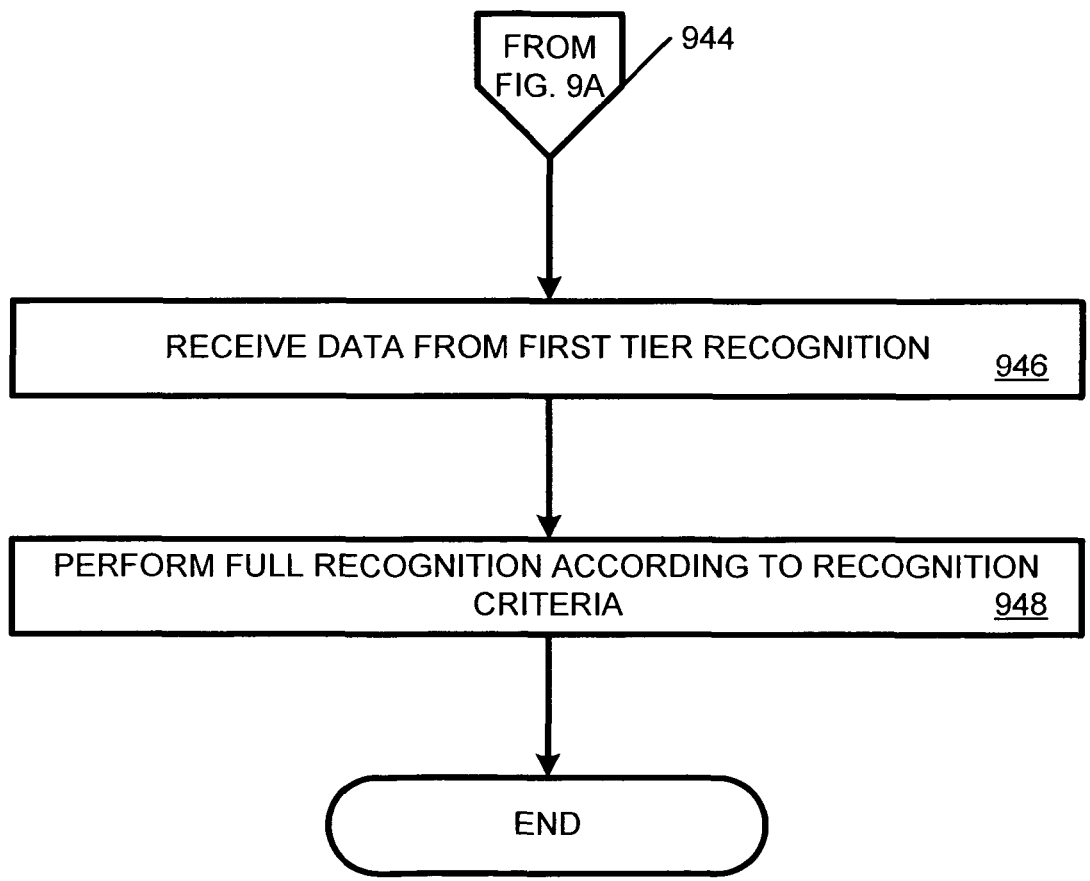
FIG. 9B is a continuation from the flowchart from FIG. 9A.

FIG. 9B is a continuation from the flowchart from FIG. 9A. As illustrated in the nonlimiting example of FIG. 9B, a flowchart begins from a jump block 942, which is continued from FIG. 9A. The call center 106 may then receive data from the first tier speech recognition server at a second tier speech recognition server (block 944). The second tier speech recognition server may then perform full recognition analytics according to the recognition criteria (block 946).

As discussed above, second tier speech recognition server may provide a more detailed speech recognition analysis of the audio data received. Similarly, some embodiments may be configured to provide a specific speech recognition analysis task such as speaker identification, speaker verification, speaker emotion, speaker confidence, and/or other types of analysis.

Figure 10A:
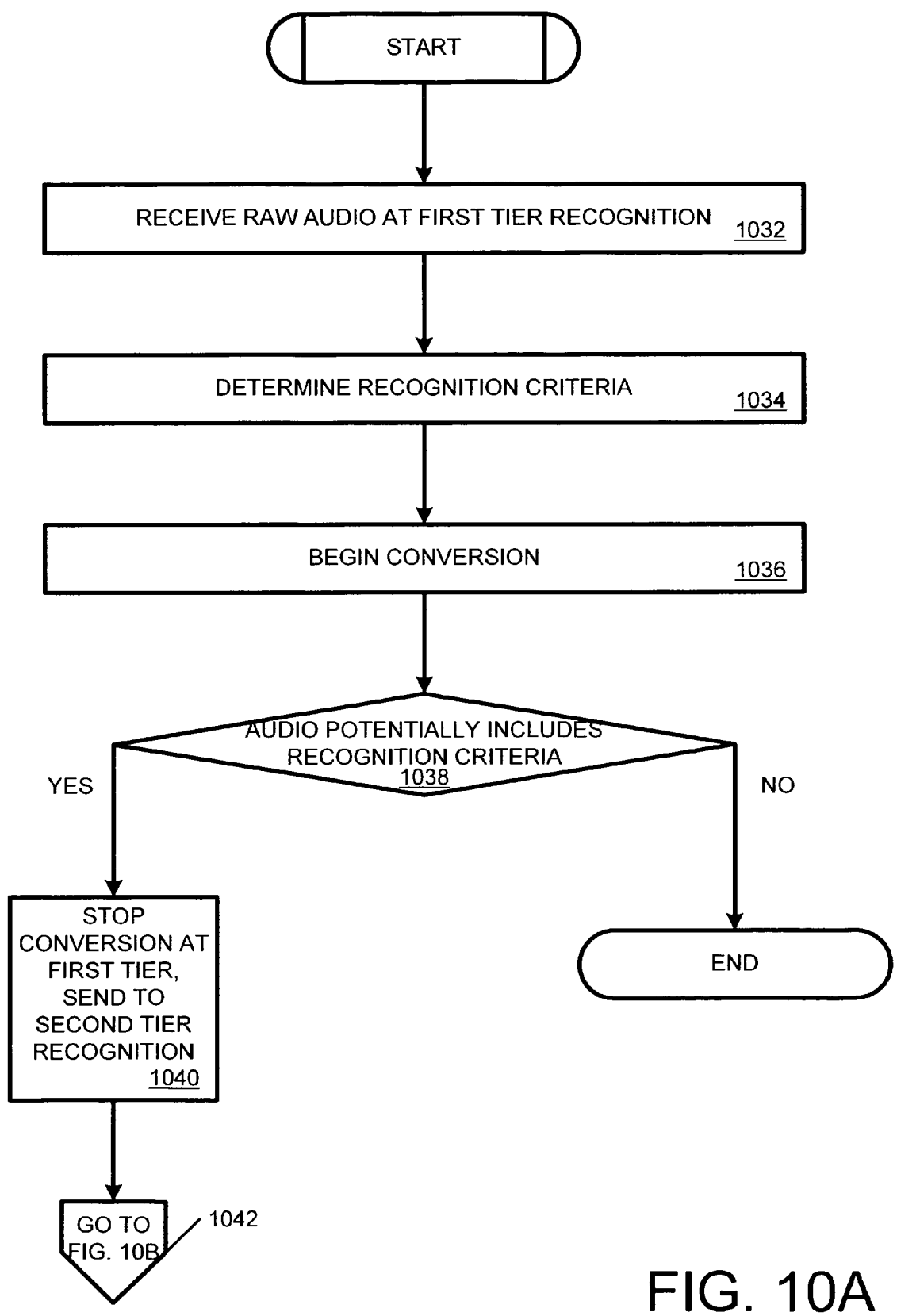
FIG. 10A is a flowchart illustrating the exemplary embodiment of a process that may be utilized for providing speech recognition in a first tier upon a determination that utilization of a second speech recognition tier is desired, similar to the flowchart from FIGS. 9A and 9B.

FIG. 10A is a flowchart illustrating the exemplary embodiment of a process that may be utilized for providing speech recognition in a first tier upon a determination that utilization of a second speech recognition tier is desired, similar to the flowchart from FIGS. 9A and 9B. As illustrated in the nonlimiting example of FIG. 10A, call center 106 may receive raw audio data at a first tier speech recognition server (block 1032). The first tier recognition server may then determine recognition criteria associated with the received audio data (block 1034). First tier speech recognition server can then begin speech to text conversion (block 1036). If at some point during the conversion, the first tier speech recognition server determines that the received valued data potentially include recognition criteria (block 1038), first tier speech recognition server can stop the conversion and send the audio data to the second tier speech recognition server (block 1040). The flowchart can then proceed to jump block 1042.

Figure 10B:
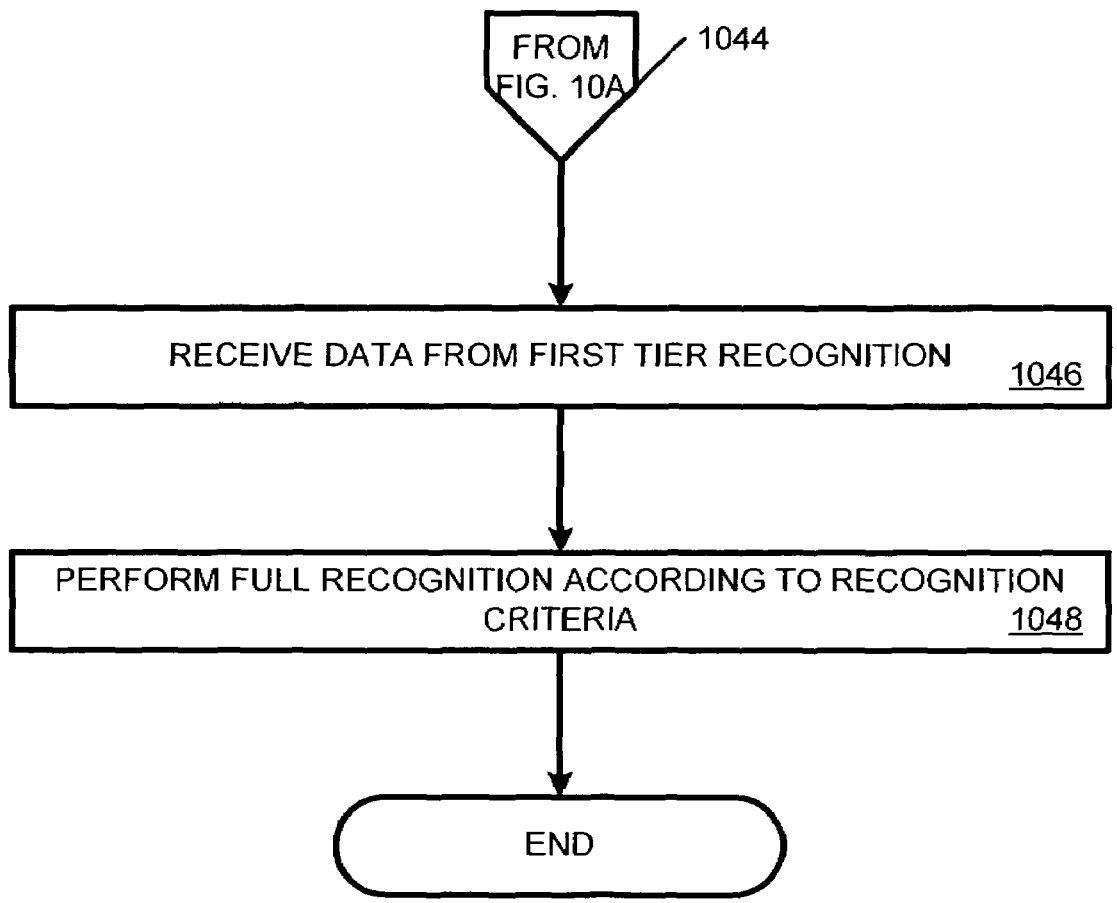
FIG. 10B is a continuation of the flowchart from FIG. 10A.

FIG. 10B is a continuation of the flowchart from FIG. 10A. As illustrated in the nonlimiting example of FIG. 10B, from jump block 1044, the second tier speech recognition server can receive data from the first tier speech recognition server (block 1046). Second tier speech recognition server can then perform full recognition according to the recognition criteria (block 1048).

As illustrated in this nonlimiting example, upon determination that the received audio contains one or more attributes associated with the determined speech criteria, according to the determined recognition criteria, first tier speech recognition server can send at least a portion of the data to the second tier speech recognition server. As such, full analysis of the received audio may be expedited.

Figure 11A:
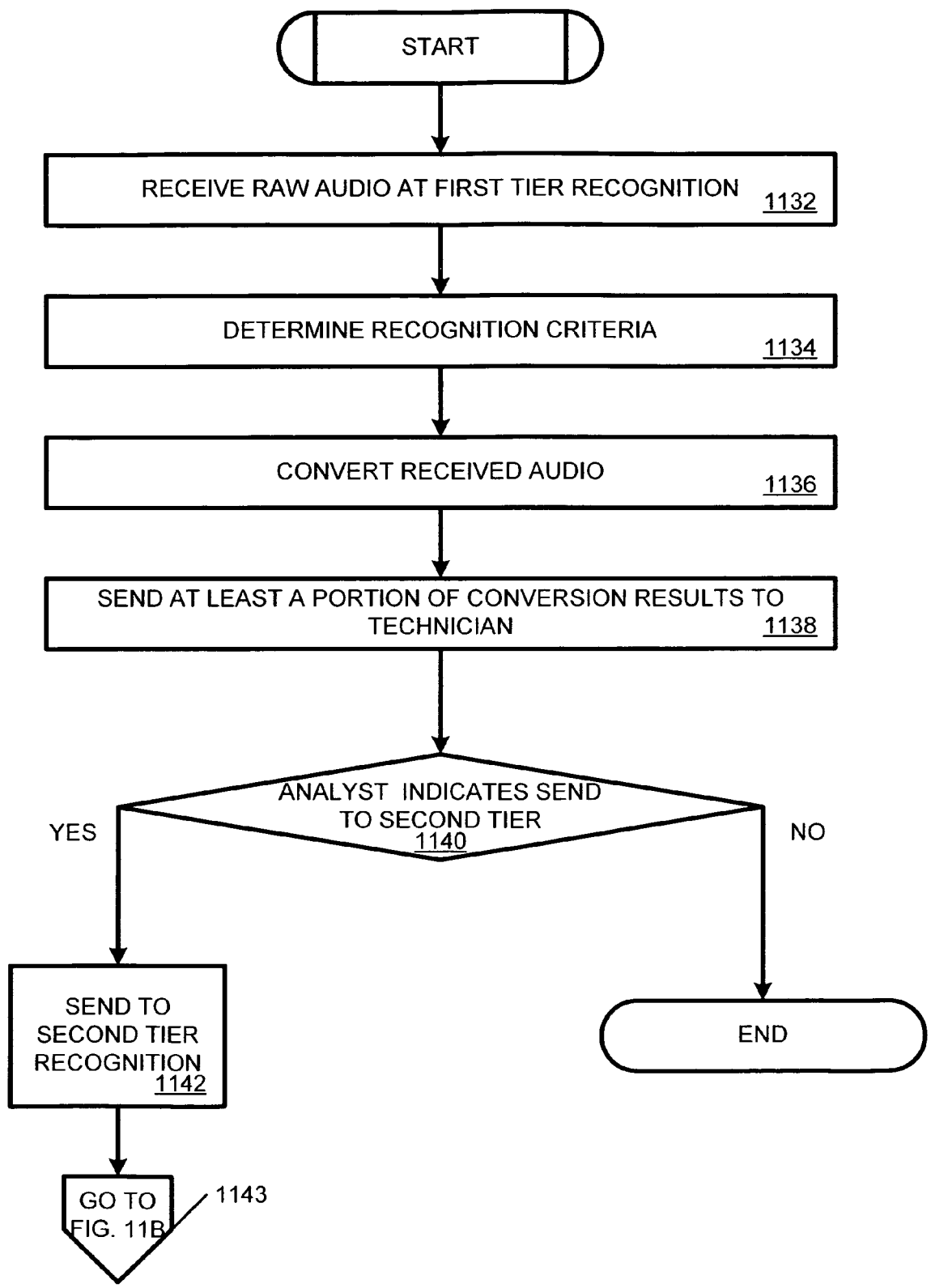
FIG. 11A is a flowchart illustrating the exemplary embodiment of a process that may be utilized for providing a user option for providing an agent an option to send audio data to a second tier speech recognition system, similar to the flowchart from FIGS. 10A and 10B.

FIG. 11A is a flowchart illustrating the exemplary embodiment of a process that may be utilized for providing a user option for providing an agent an option to send audio data to a second tier speech recognition system, similar to the flowchart from FIGS. 10A and 10B. As illustrated in the nonlimiting example of FIG. 11A, call center 106 can receive raw audio data at a first tier speech recognition server (block 1132). The first tier speech recognition server can then determine the recognition criteria associated with the received audio data (block 1134). The first tier speech recognition server can then convert the received audio into a textual format, as described above (block 1136). The first tier speech recognition server can then send at a least a portion of the conversion results to an analyst 230 (block 1138). The analyst 230 can then indicate whether to send the audio data to a second tier speech recognition server (block 1140). If the analyst 230 determines that the data need not be sent to a second tier speech recognition server, the process may end. If, however, the analyst 230 determines that further speech recognition analysis may be determined on the received audio data, the first tier speech recognition server can send at least a portion of the received audio data to a second tier speech recognition server (block 1142). Flowchart can then proceed to jump block 1143.

Figure 11B:
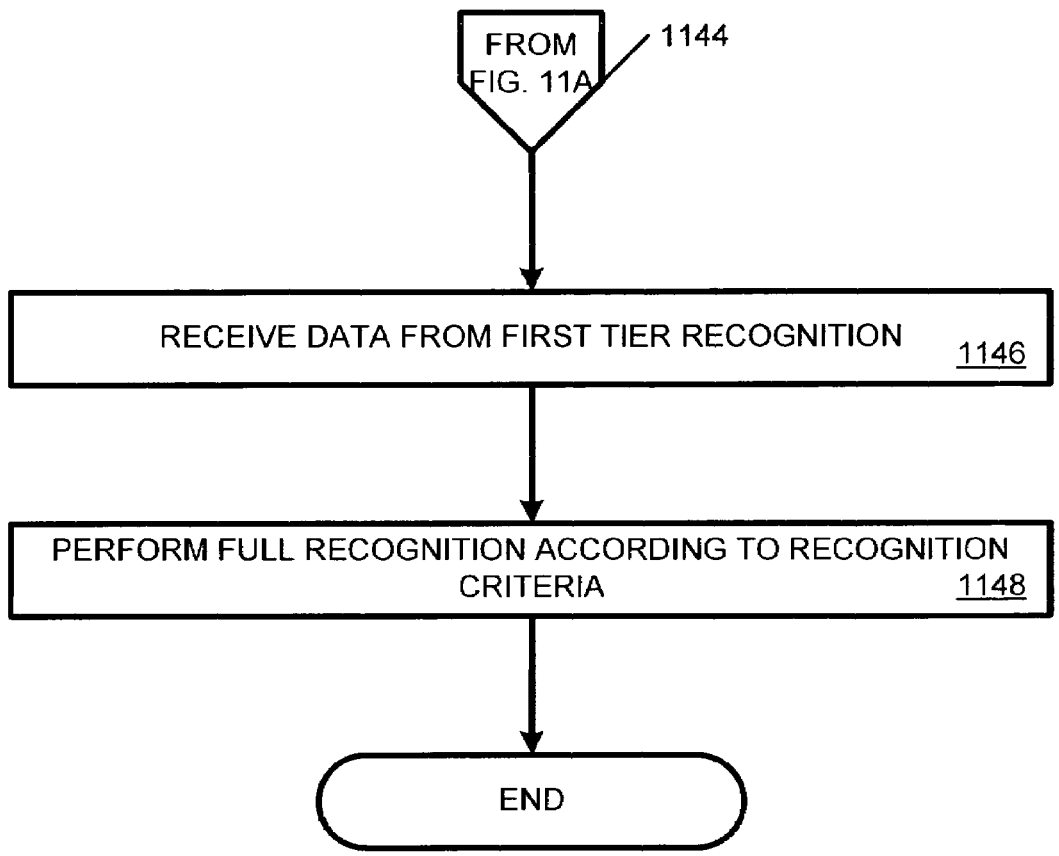
FIG. 11B is a continuation of the flowchart from FIG. 11A.

FIG. 11B is a continuation of the flowchart from FIG. 11A. As illustrated in the nonlimiting example of FIG. 11B, from jump block 1144, the second tier speech recognition server can receive at least a portion of the audio data from the first speech recognition server (block 1146). The second tier speech recognition server can then perform full recognition of the received audio data according to the recognition criteria (block 1148). As discussed above, while full recognition analytics of the received data may be performed, second tier speech recognition server may also be configured to perform specific speech recognition analytics, such as speaker identification and/or other specific speech analytics.

Figure 12A:
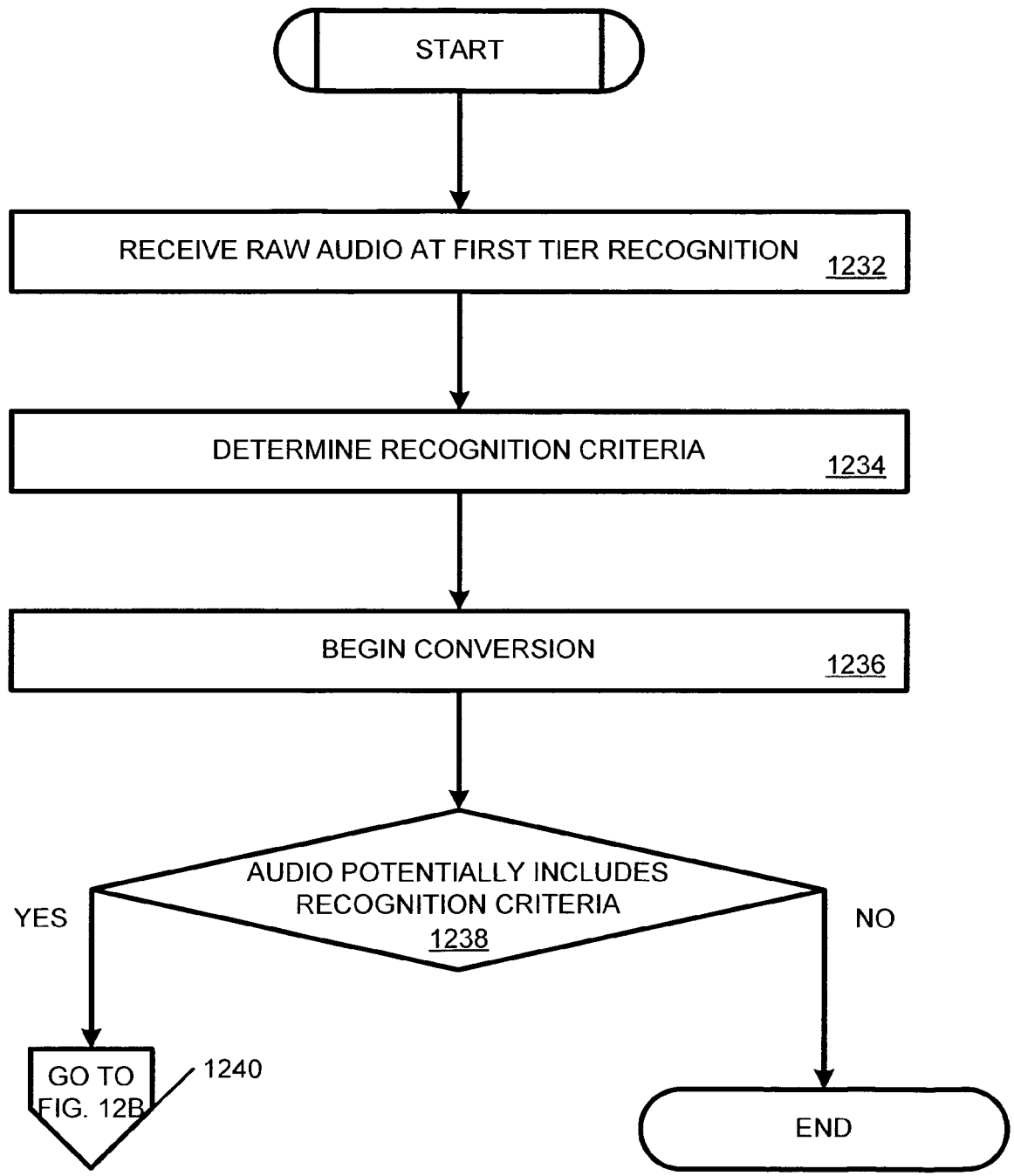
FIG. 12A is a flowchart illustrating the exemplary embodiment of a process that may be utilized for determining from a plurality of second tier speech recognition servers, which server tier direct audio data, similar to the flowchart from FIGS. 11A and 11B.

FIG. 12A is a flowchart illustrating the exemplary embodiment of a process that may be utilized for determining from a plurality of second tier speech recognition servers, which server tier direct audio data, similar to the flowchart from FIGS. 11A and 11B. As illustrated in the nonlimiting example of FIG. 12A, call center 106 can receive raw audio data at a first tier speech recognition server (block 1232). The call center 106 can then determine recognition criteria associated with the received audio data (block 1234). The first tier speech recognition server can then begin conversion of the received audio data into a textual format using phonetic speech to text conversion and/or other expedited speech to text conversion techniques (block 1236). Call center 106 may then determine whether the audio potentially include the recognition criteria (block 1238). If a determination is made that the received audio does not include the recognition criteria, the flowchart can end. If, however, a determination is made that the audio potentially include the recognition criteria, the flowchart can proceed to jump block 1240.

Figure 12B:
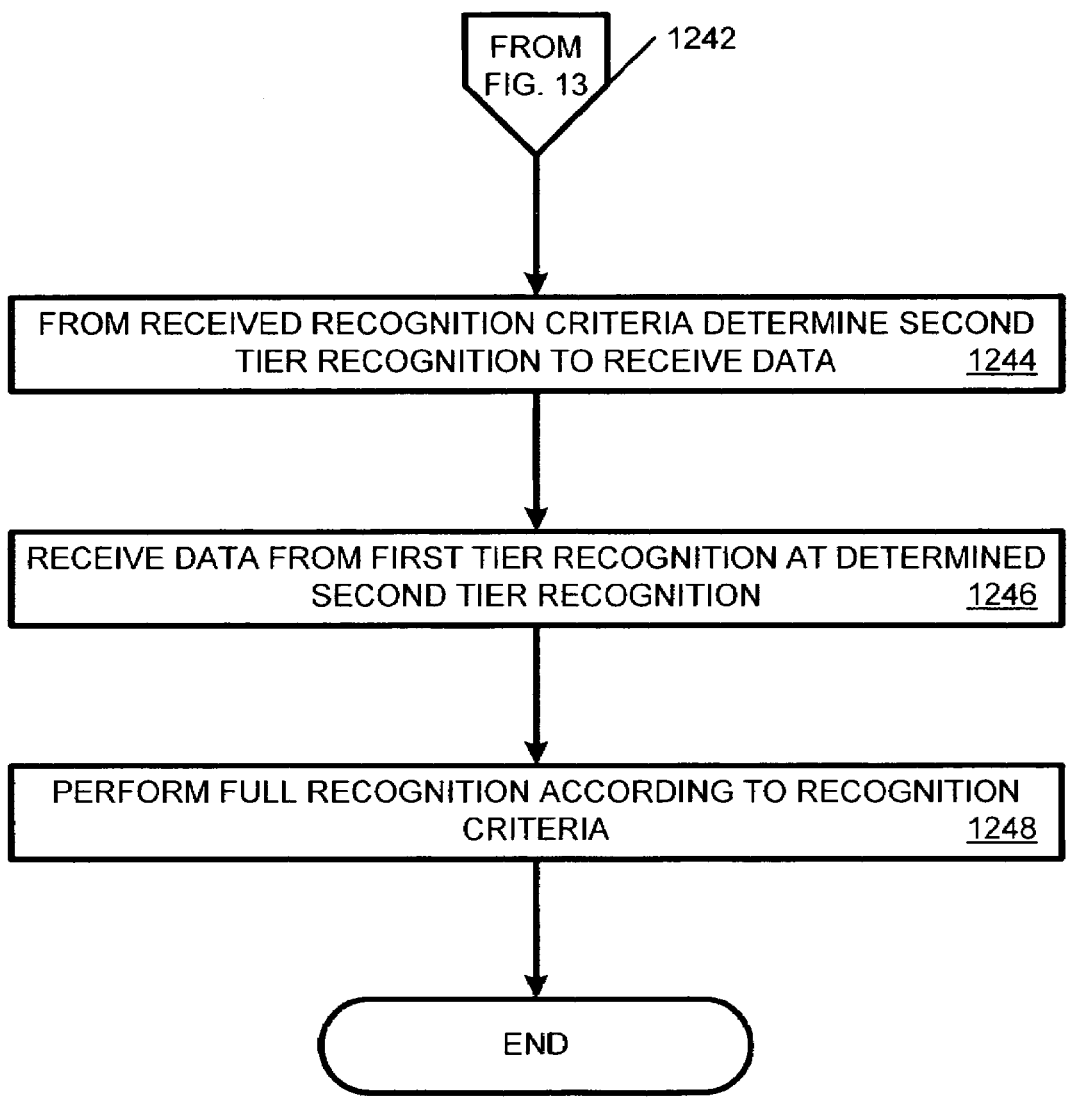
FIG. 12B is a continuation of the flowchart from FIG. 12A.

FIG. 12B is a continuation of the flowchart from FIG. 12A. As illustrated in the nonlimiting example of FIG. 12B, from jump block 1242, from the received recognition criteria, call center 106 can determine which second tier speech recognition server to be utilized for the received audio data (block 1244). Call center 106 can then receive data from the first tier speech recognition server at the determined second tier speech recognition server (block 1246). The second tier speech recognition server can then perform full recognition of the audio data according to the recognition criteria (block 1248).

It should be noted that speech analytics (i.e., the analysis of recorded speech or real-time speech) can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should also be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment disclosed herein can be implemented with any or a combination of the following technologies: a discrete logic circuit) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. A method for multi-pass analytics, comprising:
   monitoring a communication for audio data:
   receiving audio data associated with the communication;
   performing first tier speech to text analytics on the received audio data, the first tier speech to text analytics including processing the received audio data in a first manner;
   determining whether to perform second tier speech to text analytics;
   in response to determining, performing second tier speech to text analytics on the received audio data, the second tier speech to text analytics including processing the received audio in a second manner;
   forecasting an optimum level of service;
   scheduling a staffing level to achieve the forecasted optimum level of service;
   determining, from the scheduled staffing, at least one area for improvement; and
   readjusting scheduling according to the at least one area for improvement.

2. The method of claim 1, further comprising determining recognition criteria associated with the audio data, the recognition criteria being configured to indicate whether to perform second tier speech to text analytics on the received audio.

3. The method of claim 2, wherein determining whether to perform second tier speech to text analytics includes determining, from the recognition criteria, whether to perform second tier speech to text analytics on the received audio.

4. The method of claim 1, wherein processing the audio data in a first manner includes performing a speech to text conversion of the audio data and processing the audio in a second manner includes analyzing the converted audio data.

5. The method of claim 4, wherein performing a speech to text conversion of the audio data includes utilizing at least one of the following: phonetic speech to text conversion and Large Vocabulary Continuous Speech Recognition (LVCSR) speech to text conversion.

6. The method of claim 4, wherein analyzing the converted audio data includes at least one of the following: identifying a speaker, verifying a speaker, detecting speaker emotion, and detecting speaker confidence.

7. The method of claim 1, wherein determining whether to perform second tier speech recognition analytics includes receiving indication from an analyst to perform second tier speech to text analytics.

8. The method of claim 1, wherein processing the audio data in a first manner includes performing at least one of the following: automated call evaluation, automated call scoring, quality monitoring, quality assessment, script compliance, speech analytics used in conjunction with screen data, and fraud detection.

9. The method of claim 1, wherein processing the audio data in a second manner includes performing at least one of the following: automated call evaluation, automated call scoring, quality monitoring, quality assessment, script compliance, speech analytics used in conjunction with screen data, and fraud detection.

10. The method of claim 1, wherein:
    processing the audio data in a first manner includes performing a first speech to text conversion of the received audio data; and
    processing the audio data in a second manner includes performing a second speech to text conversion of the received audio data, the second speech to text conversion of the received audio data being performed at a higher accuracy threshold than the first speech to text conversion.

11. A system for multi-pass analytics, comprising:
    a receiving component configured as a recorder to receive audio data associated with a communication from a monitoring component;
    a first tier speech to text analytics component executing on a first server configured to perform first tier speech to text analytics on the received audio data in a first manner;
    a performance determining component configured to determine whether to perform second tier speech to text analytics;
    a second tier speech to text analytics component executing on a second server configured to, in response to determining, perform second tier speech to text analytics on the received audio data in a second manner;
    a forecasting component to determine an optimum level of service;
    a scheduling component to schedule a staffing level to achieve the forecasted optimum level of service,
    wherein it is determined, from the scheduled staffing, at least one area for improvement, and wherein the scheduling is readjusted according to the at least one area for improvement.

12. The system of claim 11, further comprising a criteria determining component configured to determine recognition criteria associated with the audio data, the recognition criteria being configured to indicate whether to perform second tier speech to text analytics on the received audio.

13. The system of claim 12, wherein the performance determining component is further configured to determine, from the recognition criteria, whether to perform second tier speech to text analytics on the received audio.

14. The system of claim 11, wherein performing speech to text analytics in a first manner includes performing a speech to text conversion of the audio data and performing speech to text analytics in a second manner includes analyzing the converted audio data.

15. The system of claim 14, wherein performing a speech to text conversion of the audio data includes utilizing at least one of the following: a phonetic speech to text conversion component and a Large Vocabulary Continuous Speech Recognition (LVCSR) speech to text conversion component.

16. The system of claim 11, wherein analyzing the converted audio data includes at least one of the following: identifying a speaker, verifying a speaker, detecting speaker emotion, and detecting speaker confidence.

17. The system of claim 11, wherein the performance determining component is further configured to receive indication from an analyst to perform second tier speech to text analytics.

18. The system of claim 11, wherein:
performing first tier speech to text analytics in a first manner includes performing a first speech to text conversion of the received audio data; and
performing first tier speech to text analytics in a second manner includes performing a second speech to text conversion of the received audio data, the second speech to text conversion of the received audio data being performed at a higher accuracy threshold than the first speech to text conversion.

19. A non-transitory computer readable storage medium storing containing computer executable instructions that when executed by a computing device perform a method for multi-pass analytics, comprising:
monitoring a communication for audio data:
receiving audio data associated with the communication;
performing first tier speech to text analytics on the received audio data in a first manner;
determining whether to perform second tier speech to text analytics;
in response to determining, performing second tier speech to text analytics on the received audio data in a second manner;

forecasting an optimum level of service;
scheduling a staffing level to achieve the forecasted optimum level of service;
determining, from the scheduled staffing, at least one area for improvement; and
readjusting scheduling according to the at least one area for improvement.

20. The non-transitory computer readable storage medium of claim 19, further comprising instructions for determining recognition criteria associated with the audio data, the recognition criteria being configured to indicate whether to perform second tier speech to text analytics on the received audio.

21. The non-transitory computer readable storage medium of claim 20, wherein the performance determining further configured to determine, from the recognition criteria, whether to perform second tier speech to text analytics on the received audio.

22. The non-transitory computer readable storage medium of claim 19, wherein performing speech to text analytics in a first manner includes performing a speech to text conversion of the audio data and performing speech to text analytics in a second manner includes analyzing the converted audio data.

23. The non-transitory computer readable storage medium of claim 22, wherein performing a speech to text conversion of the audio data includes utilizing at least one of the following: phonetic speech to text conversion logic and Large Vocabulary Continuous Speech Recognition (LVCSR) speech to text conversion logic.

24. The non-transitory computer readable storage medium of claim 19, wherein the second tier speech to text analytics logic is further configured to perform at least one of the following: identifying a speaker, verifying a speaker, detecting speaker emotion, and detecting speaker confidence.

25. The non-transitory computer readable storage medium of claim 19, wherein:
performing first tier speech to text analytics in a first manner includes performing a first speech to text conversion of the received audio data and analyzing the convened audio data; and
performing first tier speech to text analytics in a first manner includes performing a second speech to text conversion of the received audio data, the second speech to text conversion of the received audio data being performed at a higher accuracy threshold than the first speech to text conversion.

* * * * *